(12) United States Patent
Ullrich et al.

(10) Patent No.: US 8,915,138 B2
(45) Date of Patent: Dec. 23, 2014

(54) INERTIAL SENSOR WITH OVERLAPPING TORSIONAL SPRINGS

(75) Inventors: Guenther-Nino-Carlo Ullrich, Reutlingen (DE); Frank Fischer, Gomaringen (DE); Lars Tebje, Reutlingen (DE); Carsten Geckeler, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 293 days.

(21) Appl. No.: 13/450,901

(22) Filed: Apr. 19, 2012

(65) Prior Publication Data

US 2012/0297879 A1    Nov. 29, 2012

(30) Foreign Application Priority Data

May 26, 2011 (DE) .......................... 10 2011 076 551

(51) Int. Cl.
*G01P 15/125* (2006.01)
*G01P 15/08* (2006.01)

(52) U.S. Cl.
CPC ....... *G01P 15/125* (2013.01); *G01P 2015/0831* (2013.01)

USPC ............................................. 73/514.32

(58) Field of Classification Search
CPC ... G01P 15/125; G01P 15/0802; G01P 15/18; G01P 15/131; G01P 15/123; G01P 15/08
USPC ........................................ 73/514.32, 514.38
See application file for complete search history.

(56) References Cited

U.S. PATENT DOCUMENTS

| 8,079,262 | B2 * | 12/2011 | Guo | 73/514.32 |
| 8,096,182 | B2 * | 1/2012 | Lin et al. | 73/514.32 |
| 8,171,793 | B2 * | 5/2012 | Foster | 73/514.32 |
| 8,347,721 | B2 * | 1/2013 | Reinmuth | 73/514.32 |
| 2009/0031809 | A1 * | 2/2009 | Lin et al. | 73/514.32 |
| 2010/0186508 | A1 * | 7/2010 | Guenther et al. | 73/504.14 |
| 2012/0186346 | A1 * | 7/2012 | McNeil et al. | 73/514.32 |

* cited by examiner

*Primary Examiner* — Helen Kwok
(74) *Attorney, Agent, or Firm* — Kenyon & Kenyon LLP

(57) ABSTRACT

An inertial sensor, comprising a substrate and a rocker that is connected to the substrate via a spring apparatus, the spring apparatus having at least two springs for suspending the rocker on the substrate, the two springs being disposed with an offset from one another with reference to their longitudinal axis.

11 Claims, 14 Drawing Sheets

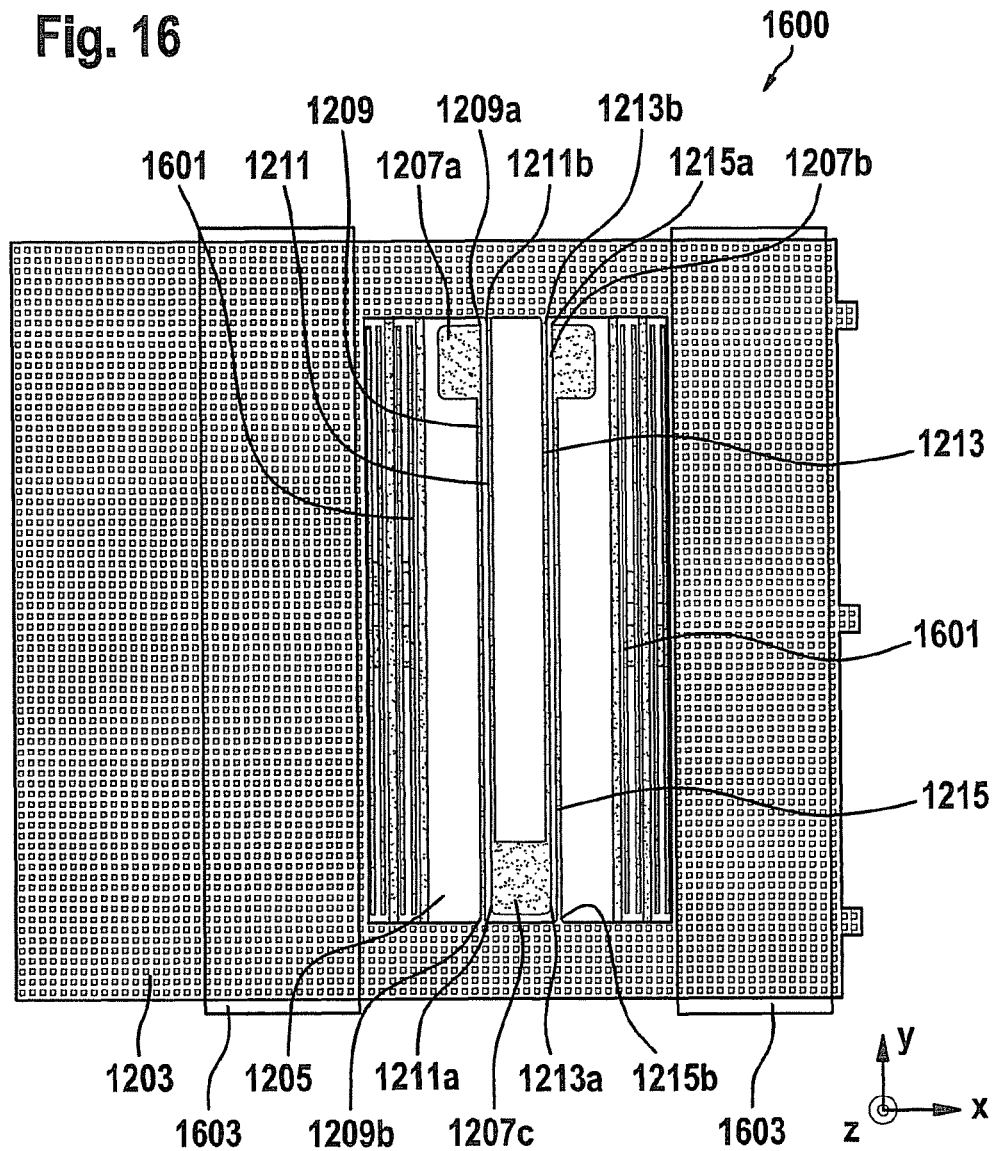

INERTIAL SENSOR WITH OVERLAPPING TORSIONAL SPRINGS

CROSS REFERENCE

The present application claims the benefit under 35 U.S.C. §119 of German Patent Application No. DE 102011076551.4 filed on May 26, 2011, which is expressly incorporated herein by reference in its entirety.

FIELD OF THE INVENTION

The present invention relates to an inertial sensor, in particular having a parallel spring.

BACKGROUND INFORMATION

Inertial sensors as such are conventional. Generally, they encompass a perforated movable rocker that is connected by way of two torsion springs to a substrate. The two torsion springs are disposed collinearly with respect to their longitudinal axes. This means, in particular, that both longitudinal axes extend along one common line.

Upon a vertical deflection of the inertial sensor with reference to the substrate plane, considerable mechanical stresses occur in the springs. Springs having a shorter spring length exhibit greater mechanical stresses than springs having a longer spring length.

It is therefore desirable to maximize the spring lengths in order to reduce the mechanical stress for a given spring width. Because of the collinear disposition of the torsion springs, however, this is possible only to a limited extent, since at the one longitudinal end of the spring the rocker acts as a delimiting element, and at the other longitudinal end of the spring the second spring, or a substrate attachment, acts as a delimiting element.

SUMMARY

An object on which the present invention is based may therefore be seen as that of supplying an inertial sensor in which mechanical stresses in the springs in the context of a vertical overload are minimized.

According to one aspect of the present invention, an inertial sensor that has a substrate and a rocker is supplied. The rocker is connected to the substrate via a spring apparatus. The spring apparatus encompasses at least two springs that suspend the rocker on the substrate. The rocker is in that respect suspended on the substrate. The two springs are disposed with an offset from one another with reference to their longitudinal axis.

For purposes of the present invention, the "longitudinal axis" refers to the axis of the spring that corresponds to the direction of its greatest extent. A "longitudinal end" for purposes of the present invention refers to an end of the spring with reference to the longitudinal axis. "Vertical" is defined with reference to the substrate plane. For better clarity, an X,Y,Z coordinate system is defined as follows: The X and Y axes lie in the substrate plane. The Z axis extends perpendicular to the substrate plane. "Collinear" means, in particular, extending on one common line.

Because both springs are disposed with an offset from one another with reference to their longitudinal axis, they no longer act as mutually delimiting elements and can thus be elongated at least in one direction without butting against one another or touching each other. A spring length can thus be increased as compared with conventional springs, advantageously resulting in a lower mechanical stress in the spring when the latter is vertically deflected. The inertial sensor according to the example embodiment of the present invention thus advantageously withstands greater mechanical acceleration forces in a vertical direction.

According to a preferred embodiment, the inertial sensor is constituted as a micromechanical inertial sensor. A micromechanical inertial sensor is constituted, in particular, using corresponding micromechanical manufacturing methods such as, for example, etching and/or lithography methods and/or electroplating methods and/or photolithography methods. The substrate is preferably a silicon wafer.

According to a preferred example embodiment, the inertial sensor is constituted as an acceleration sensor.

According to a further embodiment, the rocker is constituted as a perforated rocker. "Perforated" means in particular, for purposes of the present invention, that the rocker has at least one hole through which a fluid can flow or pass. The fluid can be, for example, an etching fluid, in particular an etching gas or an etching liquid. Because of the perforation, the fluid can advantageously act on elements that are located under the rocker, i.e., between the substrate and rocker. In particular, the fluid can act on the substrate itself. The perforation can have multiple holes that are by preference disposed in a pattern.

According to a further embodiment, more than two springs can also be provided. For example, four springs can be provided. A particularly stable but nevertheless resilient suspension system is thereby brought about. The springs are in general preferably constituted as torsion springs. The springs are constituted in particular as leaf springs. The springs can, for example, be constituted identically or differently.

In a further embodiment, the spring apparatus has at least one suspension block, connected to the substrate, on which at least one spring is mounted. The spring can preferably also be connected to the suspension block. In particular, one longitudinal end of the spring is mounted or connected to the suspension block. The other longitudinal end of the spring is then preferably mounted or connected to the rocker. In particular, two or more than two springs can also be mounted or connected to the suspension block. For example, multiple suspension blocks, in particular three or four suspension blocks, can also be constituted. The suspension block is preferably constituted integrally with the substrate. The suspension blocks can, for example, be disposed with an offset from one another relative to the longitudinal axes of the springs. A length of the springs is thus advantageously limited only by a distance from suspension block to rocker, i.e. in particular by the length of the suspension-block-to-rocker segment, and not additionally by another suspension block. In the case of an even number of suspension blocks, the latter can advantageously be disposed in pairs next to one another. In the case of four suspension blocks, the two pairs can preferably be disposed centrically symmetrically. In the case of an odd number of suspension blocks, the latter can, for example, be disposed axially symmetrically, the axis of symmetry extending parallel to a longitudinal axis of a spring.

The region on the suspension block at which the spring is mounted or connected thereto can also be referred to as a "spring attachment." The region on the suspension block that is connected to the substrate can also be referred to as a "substrate attachment." A substrate can, in particular, also be referred to as a "mainland," so that the substrate attachment can also be referred to as a "mainland attachment." According to another embodiment, the springs are disposed next to one another in at least partly overlapping fashion. The springs are preferably disposed in parallel next to one another. A corresponding inertial sensor can also be referred to as an "inertial sensor having parallel springs." In the case of an even number of springs, the latter can also be disposed in pairs extending parallel next to one another. Such spring pairs can also be referred to as "interleaved double springs." A considerably high level of torsional stiffness can thus be brought about, since the springs are also loaded flexurally in the Z direction rather than only torsionally. A modified torsional stiffness can advantageously be brought about in particular by way of a corresponding adaptation of the spacing of two double springs from one another and/or from a rotation axis of the rocker, with no change in other geometric parameters.

In accordance with a further embodiment, the rocker is suspended on the substrate asymmetrically with reference to a rotation axis of the rocker defined by way of the longitudinal axis of the springs and constituted in the rocker plane. This asymmetrical suspension advantageously brings about a tilting of the rocker upon a deflection vertically with respect to the substrate plane. A mass distribution of the rocker is, in this respect, in particular asymmetrical relative to the rotation axis.

According to another embodiment, at least one electrode is disposed on the substrate and located opposite the rocker, said electrode constituting, with the rocker, a capacitor for capacitive sensing of a deflection of the rocker.

In a further embodiment, at least two electrodes are disposed on the substrate, the electrodes being disposed opposite the rocker. Each of the electrodes constitutes, with the rocker, a capacitor, so that the two electrodes constitute, together with the rocker, a differential capacitor. Such a capacitor has, advantageously, particularly linear properties. The rocker can be, in particular, at an electrical potential CM, and the two electrodes can be, in particular, respectively at an electrical potential C1 and an electrical potential C2. Upon a deflection of the rocker, the corresponding capacitances in the capacitors change, so that the deflection of the rocker can be detected by way of a corresponding evaluation of the capacitances, the advantageous result being that an acceleration applied to the rocker can be ascertained. The electrodes can also be referred to as "detection electrodes." Detection electrodes that can detect an acceleration in an X and/or Y direction in the X,Y plane are preferably provided. The electrodes are preferably constituted as strip-shaped electrodes or strip electrodes.

According to a further embodiment, more than two electrodes can also be constituted; in particular, three, preferably four, in particular five, for example six electrodes can be constituted. A particularly sensitive capacitance measurement can thereby be carried out.

According to another embodiment, a stop for limiting a rocker deflection is constituted. The advantageous result of this is that a rocker deflection can be limited in such a way that mechanical stresses in the spring apparatus are below a predetermined value which corresponds to a value at which the inertial sensor or spring device can be damaged. In particular, the stop limits a rocker deflection that extends parallel to the substrate. For example, multiple stops can also be constituted.

According to another embodiment, the rocker has a cutout in which the spring apparatus is disposed. In this context, in particular, a symmetry center of the cutout is not identical to a symmetry center of the rocker, thus advantageously making possible an asymmetrical suspension.

In a further embodiment, the inertial sensor is constituted as a multi-channel inertial sensor, in particular as a multi-channel acceleration sensor.

The present invention is explained in further detail below on the basis of preferred exemplifying embodiments with reference to the Figures.

BRIEF DESCRIPTION OF THE DRAWINGS

FIG. 16 shows the inertial sensor of FIG. 15 having detection electrodes.

DETAILED DESCRIPTION OF EXAMPLE EMBODIMENTS

Figure 1:
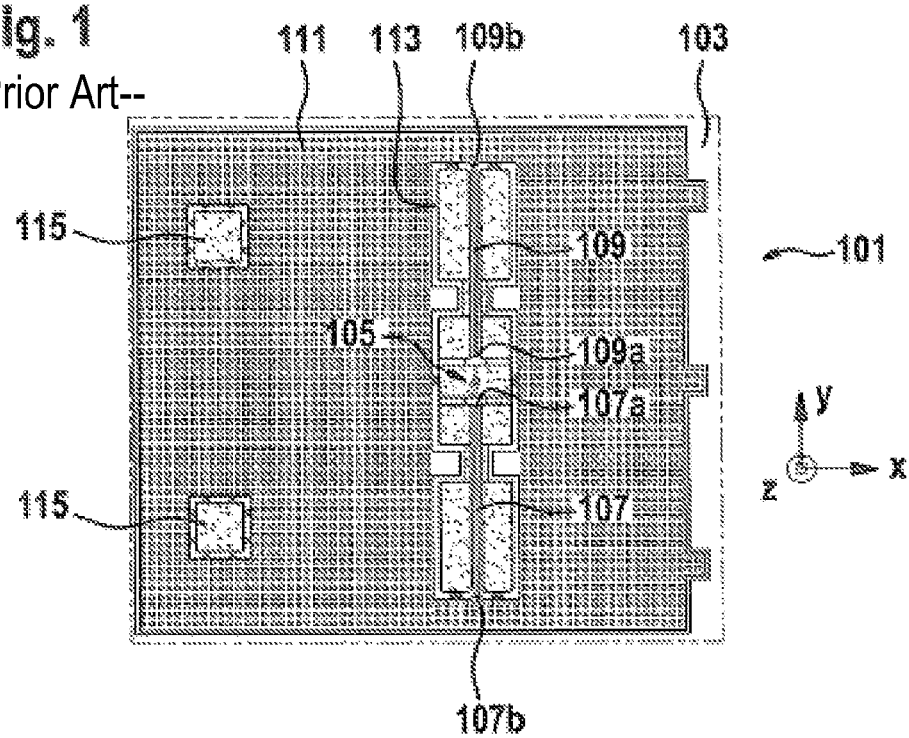
FIG. 1 is a plan view of a conventional inertial sensor.

Identical reference characters are used hereinafter for identical features.

FIG. 1 is a plan view of a conventional inertial sensor 101. Inertial sensor 101 encompasses a quadrangular substrate 103 on which is constituted a spring suspension block 105 for two springs 107, 109. Constituted parallel to substrate 103 is a perforated rocker 111 that has an opening 113. Spring suspension block 105 and the two springs 107 and 109 are disposed in cutout 113. The two springs 107, 109 are disposed collinearly with reference to their longitudinal axis. This means, in particular, that the two longitudinal axes extend on one common line. Spring 107 is mounted with its first longitudinal end 107a on spring suspension block 105. The other longitudinal end 107b of spring 107 is connected to rocker 111. Analogously, spring 109 also has a first longitudinal end 109a that is mounted on spring suspension block 105. Second longitudinal end 109b of spring 109 is connected to rocker 111.

The reference character 115 further identifies two mechanical stops that can limit a lateral deflection of rocker 111, i.e. in particular a deflection in an X,Y plane.

Because, as a result of the collinear disposition of the two springs 107, 109, the two longitudinal ends 107a, 109a would get in one another's way if springs 107, 109 were to be extended, a respective length of the two springs 107, 109 is limited by the length of the spring suspension block segment 105 and the mounting region of second longitudinal ends 107b and 109b on rocker 111. In that regard, upon a vertical deflection, i.e., in the Z direction (the substrate plane lying in the X,Y plane), considerable mechanical stresses can occur in springs 107, 109, which can result in spring breakage.

Figure 2:
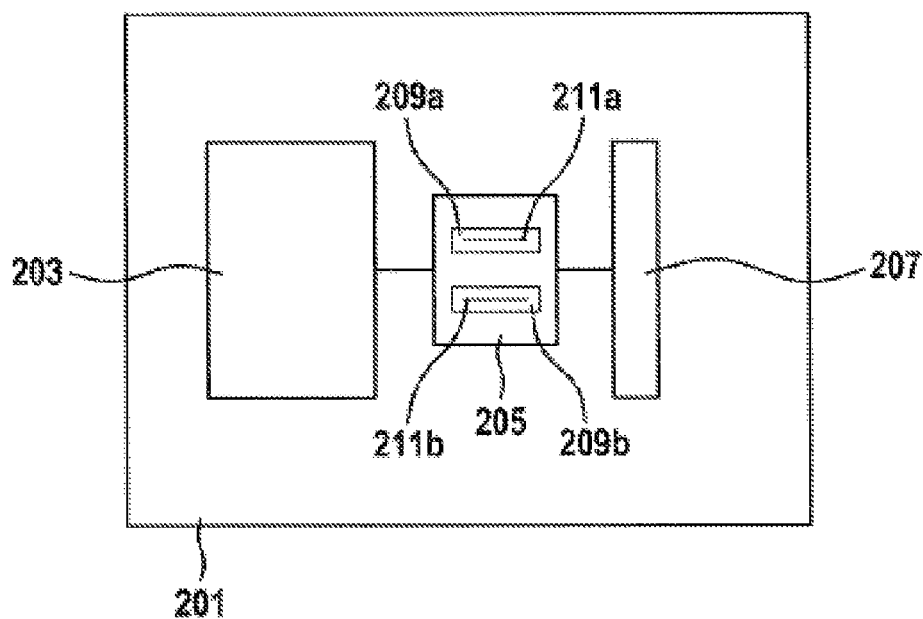
FIG. 2 schematically depicts an inertial sensor according to the present invention.

FIG. 2 shows an inertial sensor 201 according to the present invention encompassing a substrate 203. Also constituted is a spring apparatus 205 that connects substrate 203 to a rocker 207. Spring apparatus 205 has two springs 209a, 209b. A respective longitudinal axis of springs 209a, 209b is labeled with reference characters 211a, 211b. As is clearly apparent, the two springs 209a, 209b are disposed with an offset from one another with reference to their longitudinal axes 211a, 211b. The advantageous result is that the two springs 209a, 209b are no longer in each other's way in a longitudinal direction, advantageously making possible a greater prolongation, in a longitudinal direction, of springs 209a, 209b as compared with the existing art. Mechanical loads in springs 209a, 209b can thus be considerably reduced in the context of a vertical deflection of springs 209a, 209b. "Vertical" means here, in particular, perpendicular to longitudinal axes 211a, 211b. The mechanical stresses in the context of a vertical overload are thus advantageously limited, which avoids spring breakages.

In an embodiment that is not shown, more than two springs can also be provided. In a further embodiment that is not shown, the inertial sensor is constituted as a micromechanical inertial sensor. In a further exemplifying embodiment (not shown), the inertial sensor is preferably constituted as an acceleration sensor, in particular as a micromechanical acceleration sensor. The springs are preferably constituted as torsion springs or leaf springs.

Figure 3:
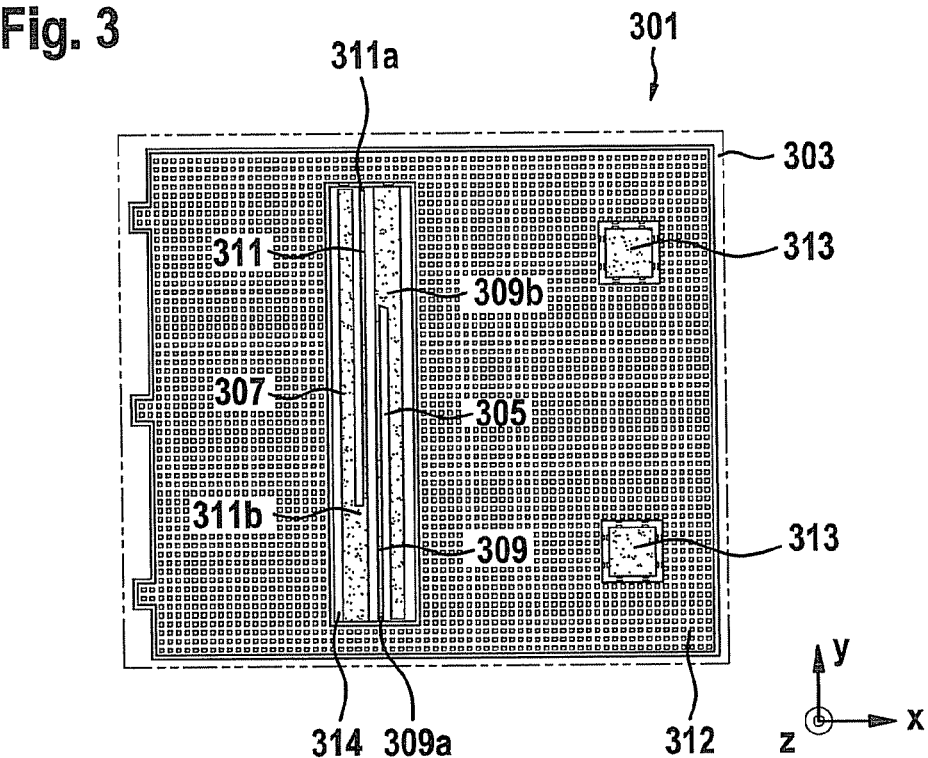
FIG. 3 is a plan view of a further inertial sensor according to the present invention.

FIG. 3 is a plan view of a further inertial sensor 301 according to the present invention encompassing a substrate 303. Two suspension blocks 305, 307 are disposed on substrate 303. Also constituted are two springs 309 and 311. Constituted parallel to substrate 303 is a perforated rocker 312 that has an opening 314. Suspension blocks 305 and 307, having springs 309 and 311, are disposed in cutout 314. A symmetry center of cutout 314 is not identical to a symmetry center of rocker 312, so that rocker 312 has an asymmetrical mass distribution.

Spring 309 is connected at its one longitudinal end 309a to the perforated rocker 312. The other longitudinal end 309b is mounted on suspension block 305. Analogously, one longitudinal end 311a of spring 311 is mounted on rocker 312. The other longitudinal end 311b of spring 311 is mounted on suspension block 307.

As FIG. 3 clearly shows, the two springs 307, 309 are disposed with an offset from one another with reference to their longitudinal axes which extend in the Y direction, and can thus be made longer than if they were disposed collinearly.

The reference character 313 further identifies two stops for limiting a deflection of rocker 312.

Figure 4:
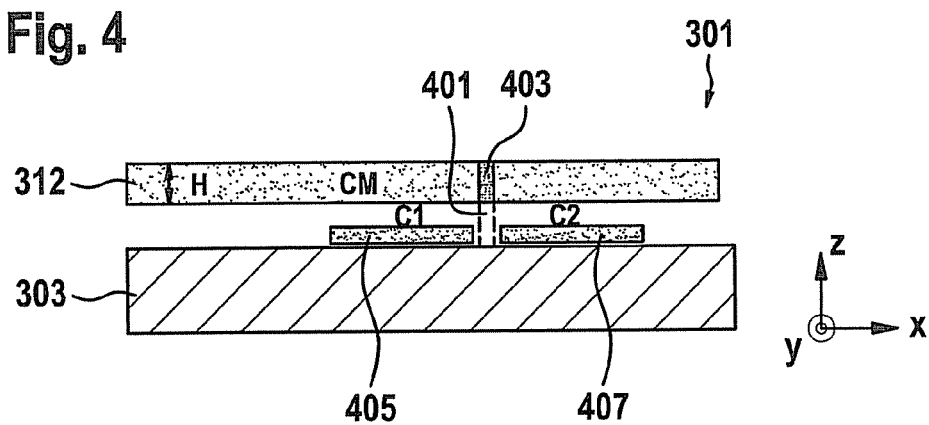
FIG. 4 is a side view of an inertial sensor according to the present invention.

FIG. 4 is a side view, in the Y direction, of an inertial sensor 401 according to the present invention. Because the depiction in FIG. 4 is a side view, the springs are not shown. For the sake of clarity, the perforation of rocker 312 is also not drawn in. An extent of rocker 312 in the direction of the Z axis is labeled "H" for height. Reference character 401 identifies a mainland attachment. Reference character 403 identifies a spring attachment.

Two electrodes 405, 407 are disposed on substrate 303 so that they are located opposite rocker 312. The two electrodes 405 and 407 are disposed next to one another on substrate 303, mainland attachment 401 being located between the two electrodes 405 and 407. The two electrodes 407, 409 are respectively at an electrical potential C1 and C2. Rocker 312 is at a potential CM. The two electrodes 407 and 409, and rocker 312, thus constitute a differential capacitor.

Upon an acceleration of inertial sensor 401 in the Z direction, i.e., vertically with respect to the substrate plane or rocker plane, the rocker is tilted in the Z direction. A capacitance of the differential capacitor will thus change; this can be sensed, so that advantageously the acceleration can correspondingly be ascertained.

Figure 5:
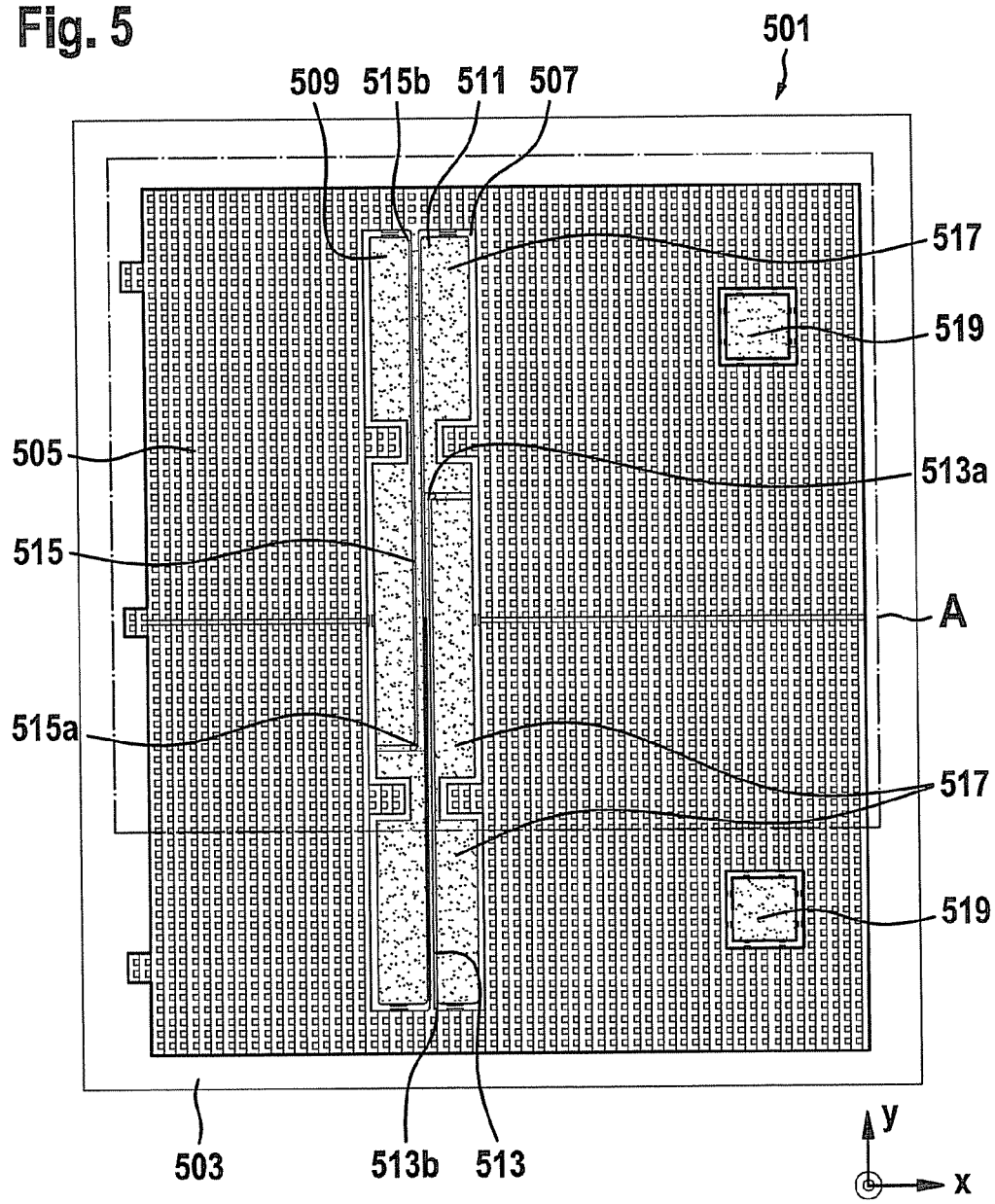
FIG. 5 is a plan view of another inertial sensor according to the present invention.

FIG. 5 is a plan view of a further inertial sensor 501 according to the present invention encompassing a substrate 503 and a perforated rocker 505 having a cutout 507. Two suspension blocks 509 and 511, each having a spring 513 and 515, are disposed in cutout 507. Spring 513 has a first longitudinal end 513a and a second longitudinal end 513b. Analogously, spring 515 has a first longitudinal end 515a and a second longitudinal end 515b. First longitudinal ends 513a and 515a are mounted respectively on suspension block 511 and on suspension block 509. Second longitudinal ends 513b and 515b are mounted on the perforated rocker 505. Reference character 517 identifies a mainland attachment. The reference character 419 identifies two stops. The longitudinal axes of springs 513 and 515 extend parallel to one another in the Y direction, but are disposed with an offset in the X direction with reference to one another.

Figure 6:
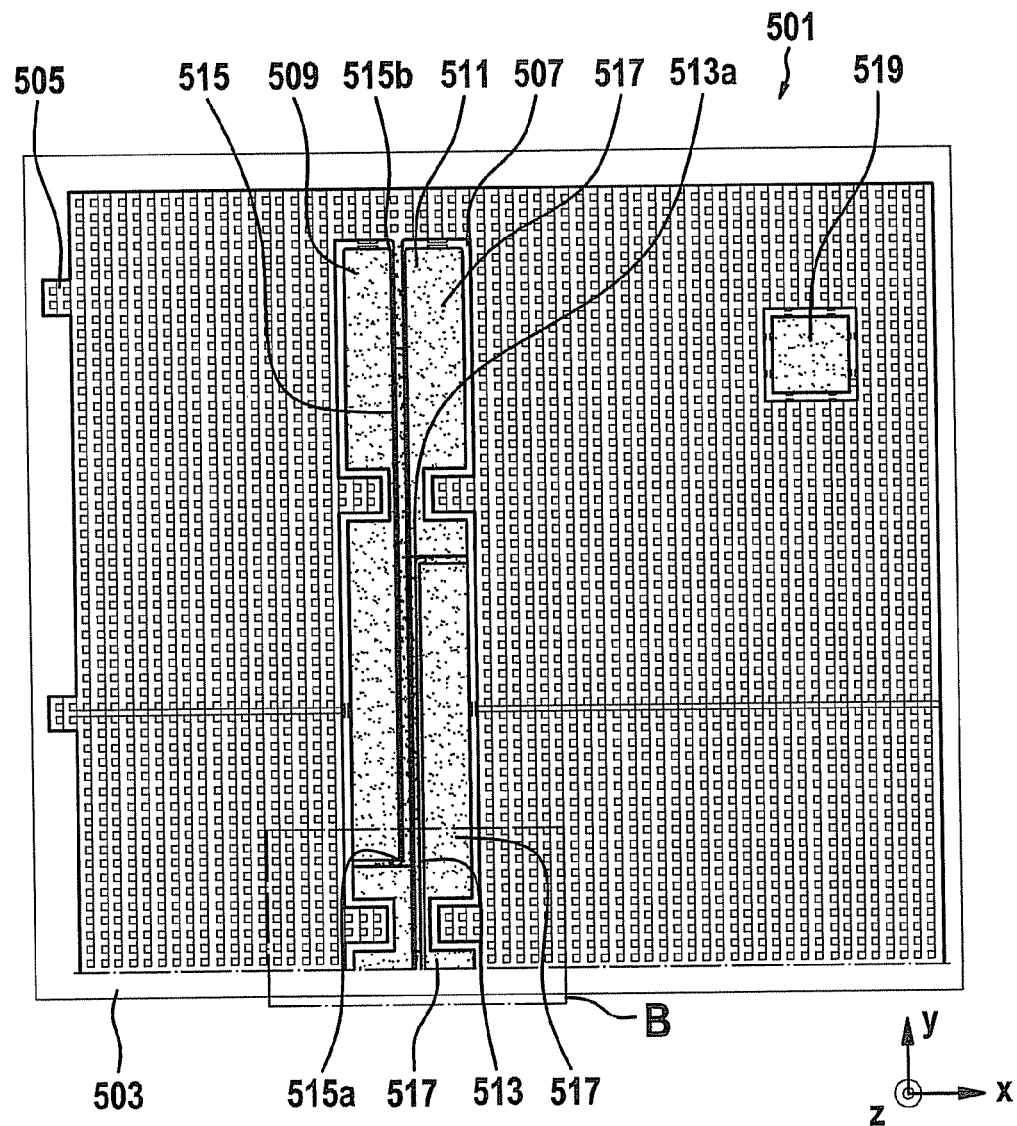
FIG. 6 is an enlarged view of a portion of the inertial sensor of FIG. 5.

FIG. 6 is an enlarged view of the region labeled with the letter "A" in FIG. 5.

Figure 7:
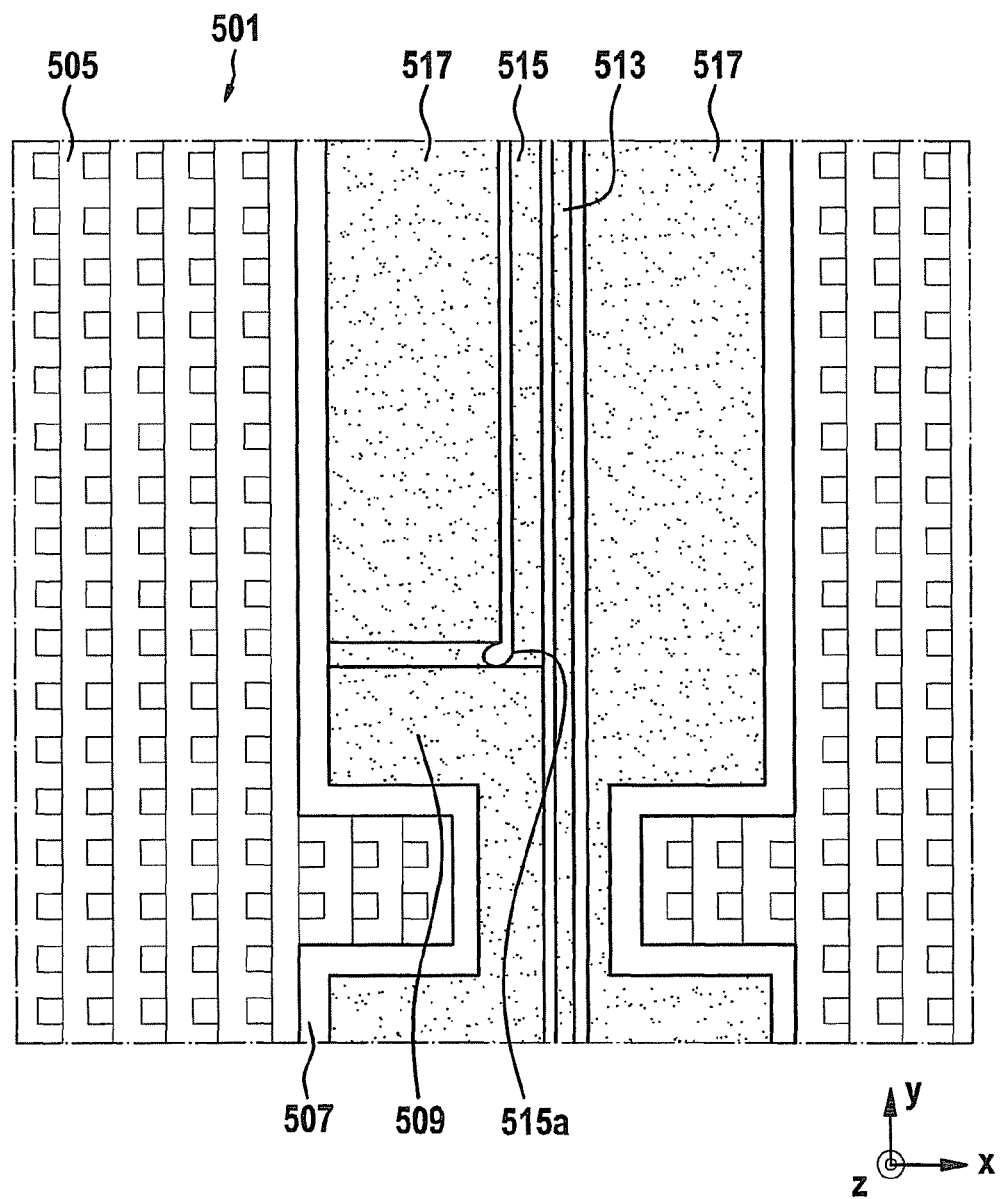
FIG. 7 is an enlarged view of a portion of the inertial sensor of FIG. 6.

FIG. 7 is an enlarged view of the region labeled with the letter "B" in FIG. 6.

Figure 8:
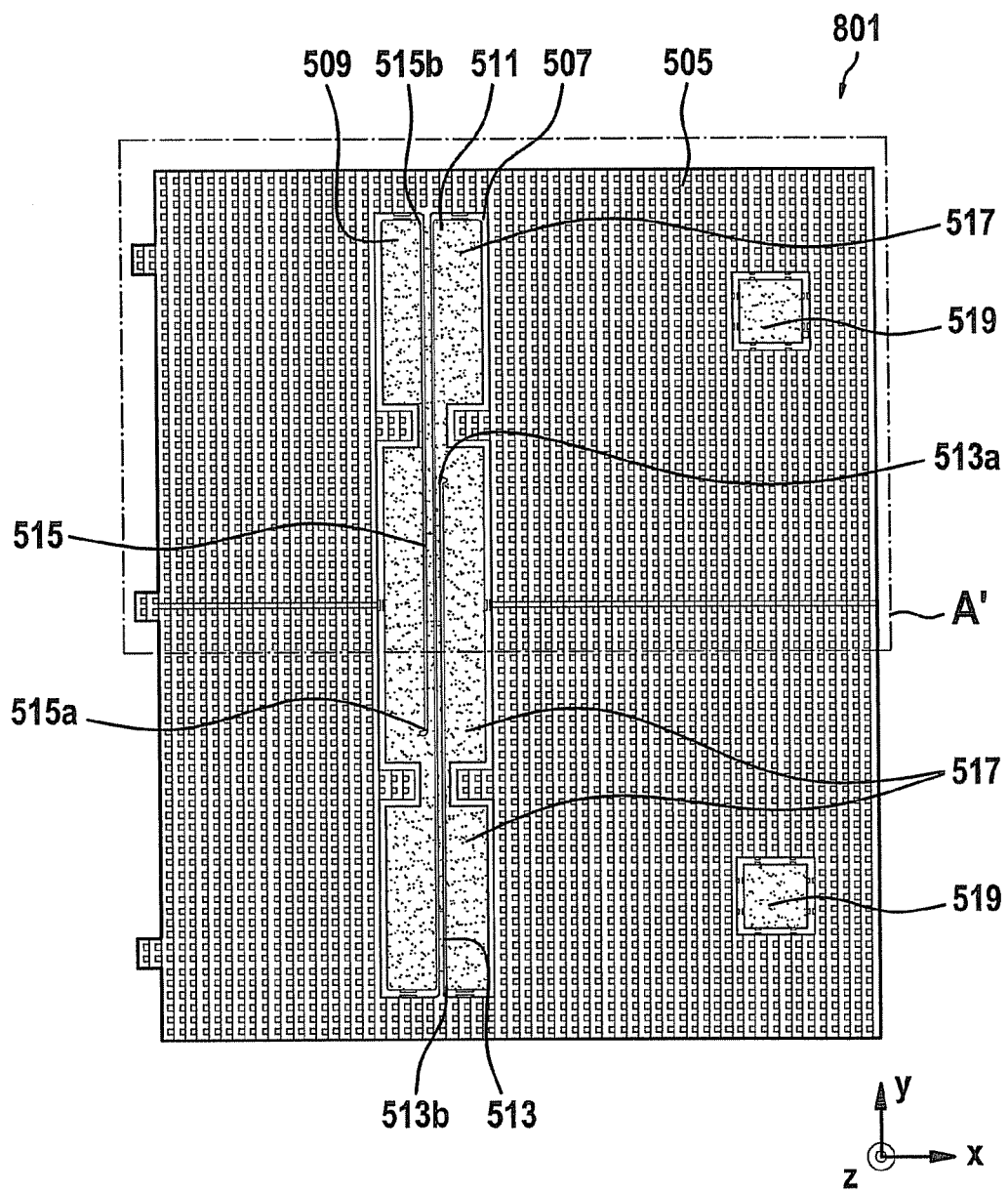
FIG. 8 is a plan view of a further inertial sensor according to the present invention.
Figure 9:
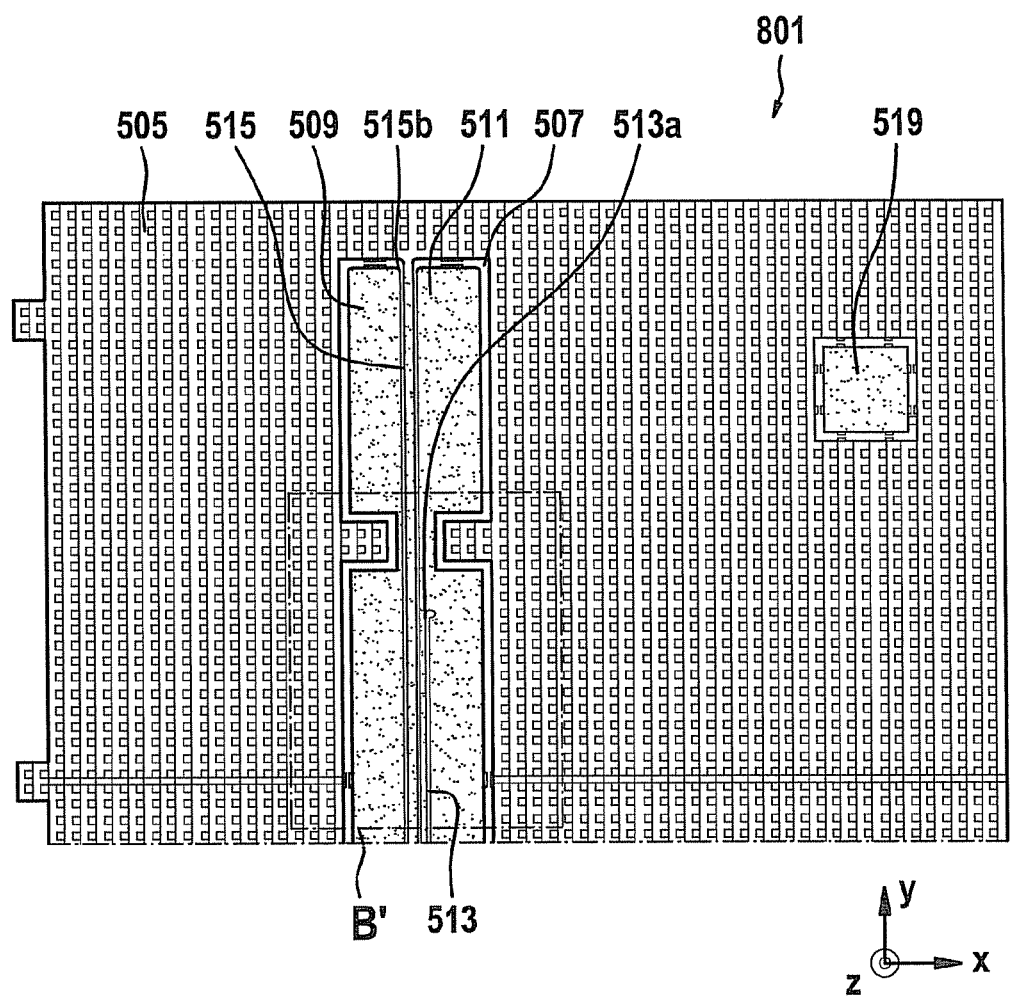
FIG. 9 is an enlarged view of a portion of the inertial sensor of FIG. 8.
Figure 10:
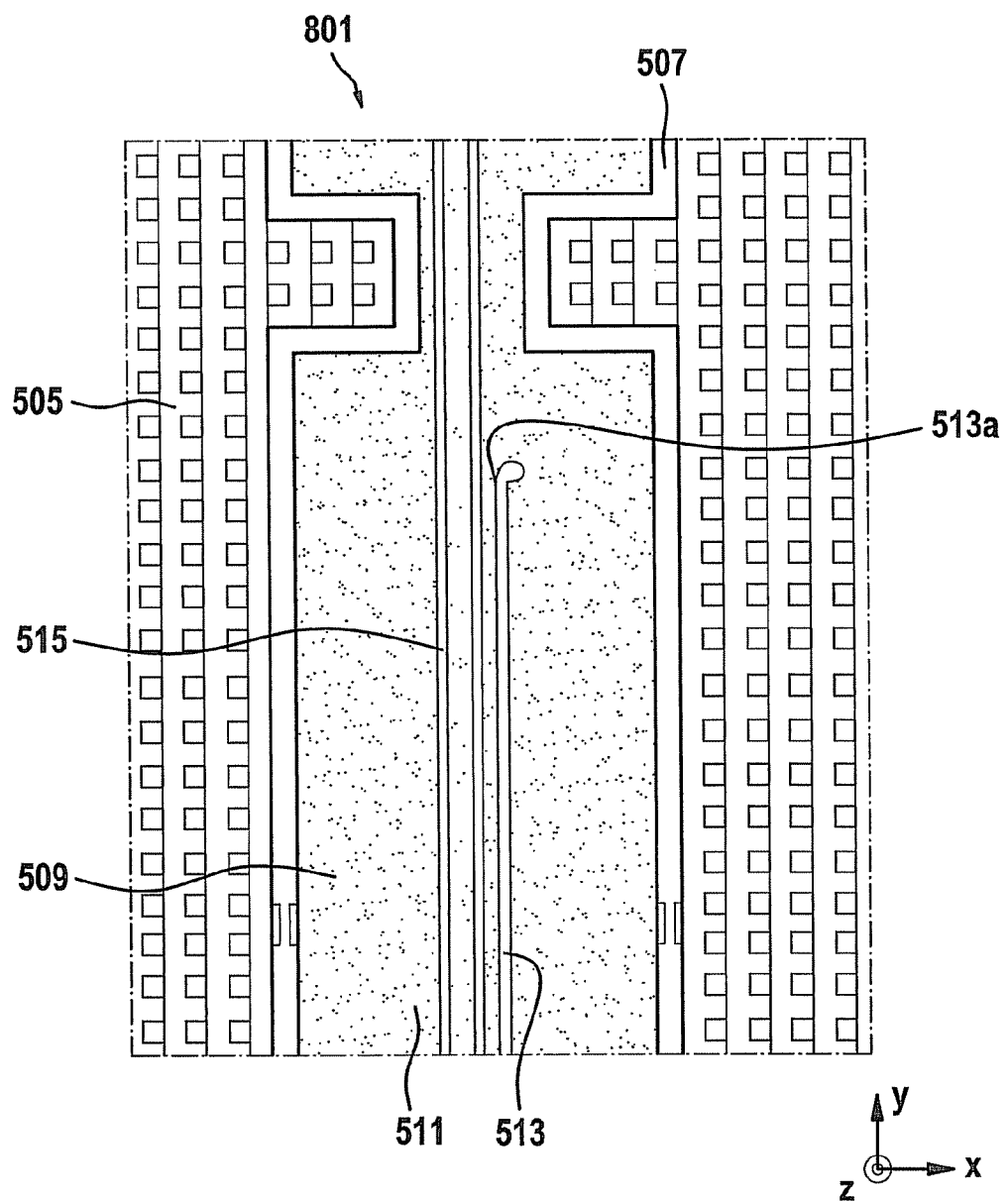
FIG. 10 is an enlarged view of a portion of the inertial sensor of FIG. 9.

FIG. 8 is a plan view of a further inertial sensor 801 according to the present invention. For clarity, substrate 503 is not shown. The region labeled with the latter "A" in FIG. 8 is depicted in enlarged fashion in FIG. 9. The region labeled with the letter "B" in FIG. 9 is depicted in enlarged fashion in FIG. 10.

Figure 11:
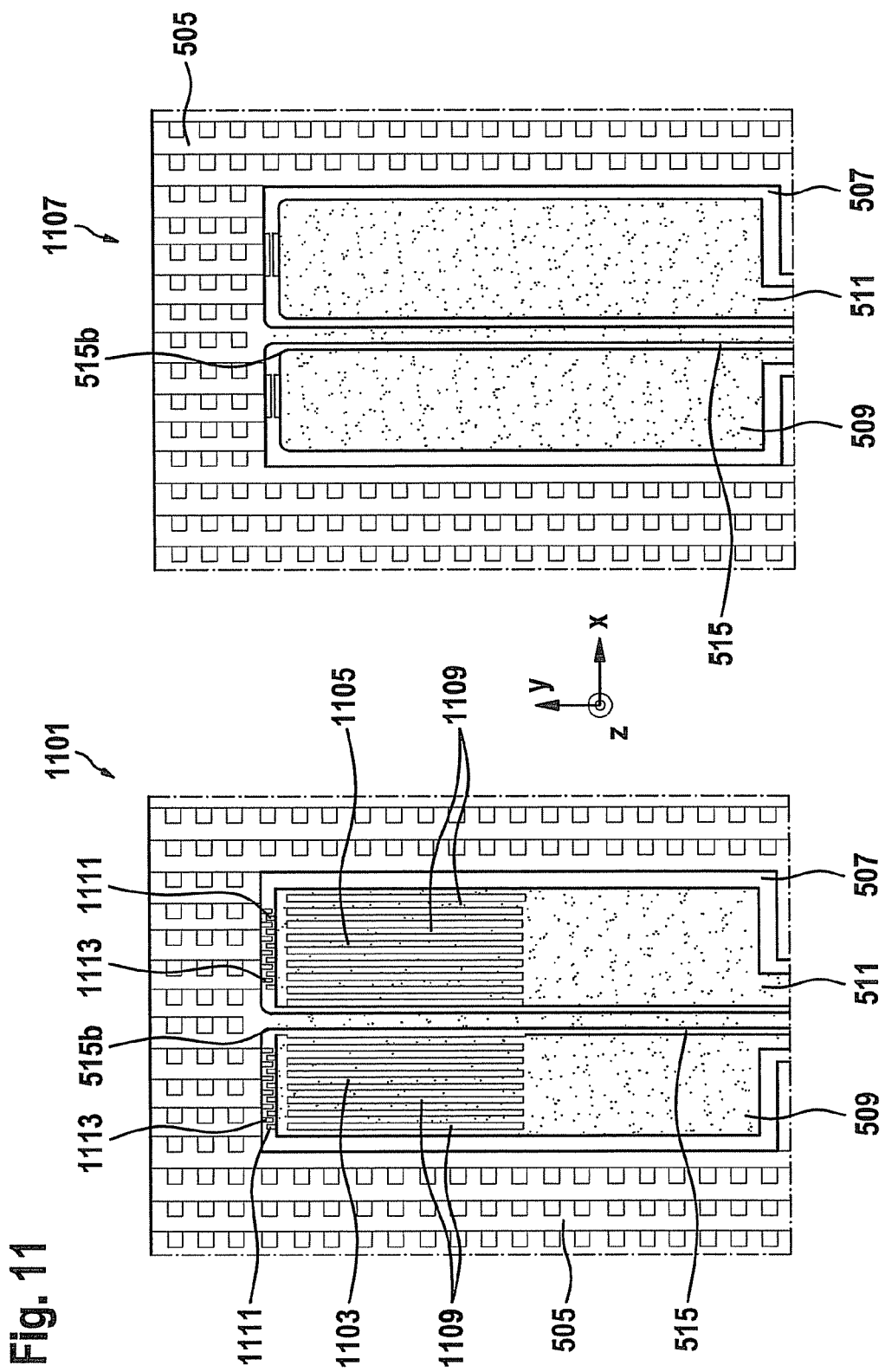
FIG. 11 shows respective plan views of a portion of an inertial sensor according to the present invention, in one case having and in one case not having energy-optimized stops.

FIG. 11 shows, in the left drawing, a partial view of an inertial sensor 1101 according to the present invention having two energy-optimized stops 1103 and 1105. The right drawing in FIG. 11 is a partial view of a further inertial sensor 1107 according to the present invention not having such energy-optimized stops 1103 and 1105. For clarity, a substrate is not depicted in the figures. The two energy-optimized stops 1103 and 1105 are disposed in an end region, facing rocker 505 in the Y direction, of suspension blocks 509 and 511 respectively, and each encompass multiple springs 1109 disposed in parallel and having a high spring constant, so that springs 1109 have a high level of stiffness. Springs 1109 can, in particular, have an identical or a different spring constant.

Constituted at an end region, facing rocker 505 in the Y direction, of stops 1103 and 1105 are respective contact projections 1111 in a comb shape. Disposed in gaps between contact projections 1111 are further contact projections 1113 that are connected to rocker 505. In the context of a sufficiently large deflection of rocker 505 in the X,Y plane, contact projections 1111 and 1113 contact or touch one another. In that respect they form a contact region. A further deflection of rocker 505 is thus prevented. The motion of rocker 505 is in this context cushioned by way of springs 1109, so that a mechanical load on suspension blocks 509 and 511 is advantageously decreased.

Figure 12:
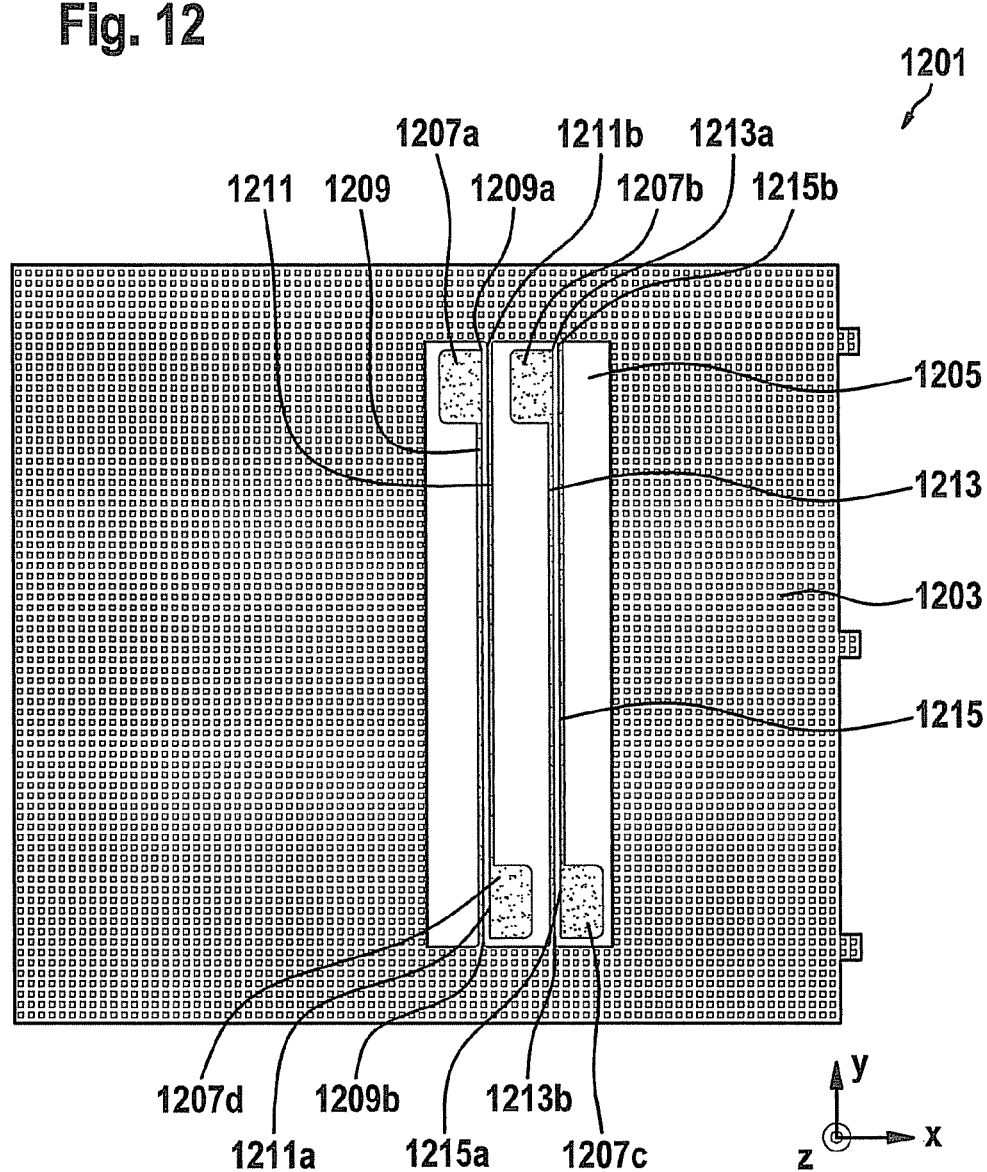
FIG. 12 is a plan view of a further inertial sensor according to the present invention.

FIG. 12 is a plan view of a further embodiment of an inertial sensor 1201 according to the present invention. Inertial sensor 1201 encompasses a perforated rocker 1203 having a quadrangular cutout 1205, a symmetry center of cutout 1205 being not identical to a symmetry center of rocker 1203. Rocker 1203 thus has, in this respect, an asymmetrical mass distribution. Constituted in cutout 1205 are four suspension blocks 1207a, 1207b, 1207c, and 1207d that are connected to a substrate (not shown) disposed under rocker 1203. Suspension blocks 1207a and 1207b, as well as 1207c and 1207d, are disposed in pairs with respect to one another, the two pairs being disposed in cutout 1205 centrically symmetrically relative to the symmetry center of cutout 1205.

In addition, each respective spring 1209, 1211, 1213, and 1215 is mounted, with a first longitudinal end 1209a, 1211a, 1213a, and 1215a, on suspension blocks 1207a, 1207b, 1207c, and 1207d. Second longitudinal end 1209b, 1211b, 1213b, and 1215b is mounted on the rocker; springs 1209, 1211, 1213, and 1215 are constituted to extend in the Y direction parallel to two sides of the quadrangular cutout 1205.

Springs 1209 and 1211 as well as springs 1213 and 1215 thus constitute, in particular, two interleaved double springs.

Figure 13:
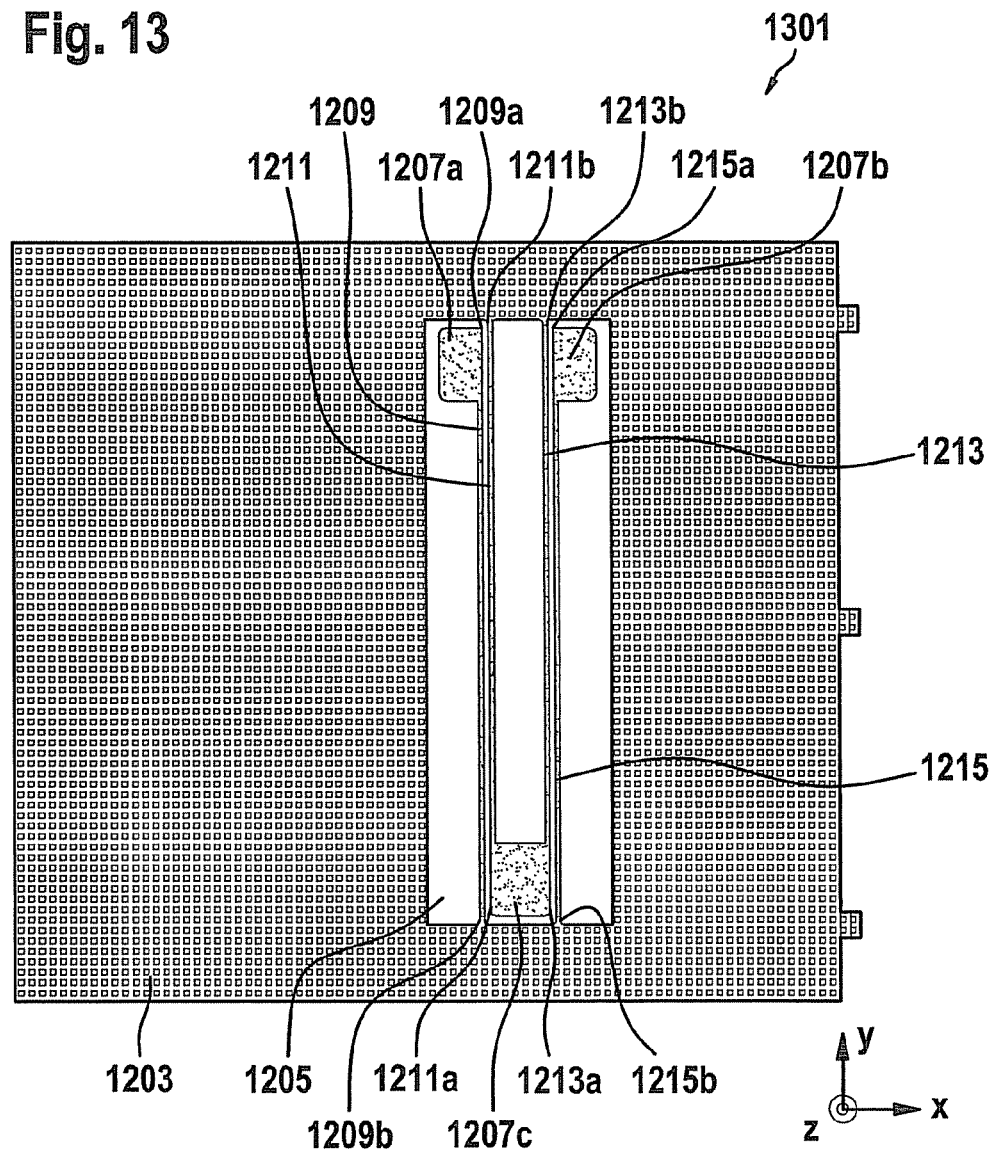
FIG. 13 is a plan view of a further inertial sensor according to the present invention.

FIG. 13 is a plan view of another embodiment of an inertial sensor 1301 according to the present invention. In contrast to inertial sensor 1201 of FIG. 12, only three suspension blocks 1207a, b, and *c* are disposed in cutout 1205. Two suspension blocks 1207a and 1207b are disposed at the upper end in the two corners of the quadrangular cutout 1205. The third suspension block 1207c is disposed centeredly at the lower end of cutout 1205. Four springs 1209, 1211, 1213, and 1215 are nevertheless also constituted, and are mounted (analogously to FIG. 12) with their two longitudinal ends respectively on the suspension block and on rocker 1203. A respective spring 1211 and 1213 is mounted, with its respective longitudinal end 1211a and 1213a, on both sides of suspension block 1207c.

Here as well, the two springs 1209 and 1211 as well as springs 1213 and 123 constitute two interleaved double springs, but they are disposed axially symmetrically with respect to one another in the Y direction with reference to the axis of symmetry of cutout 1205.

Because the two interleaved double springs extend parallel to one another (i.e., are disposed next to one another), a distinctly elevated torsional stiffness can advantageously be achieved, since the springs are also loaded flexurally in the Z direction rather than only torsionally. A centrically symmetrical disposition as shown in FIG. 12, and an axially symmetrical disposition as shown in FIG. 13, of the two double springs is possible in this context.

Figure 14:
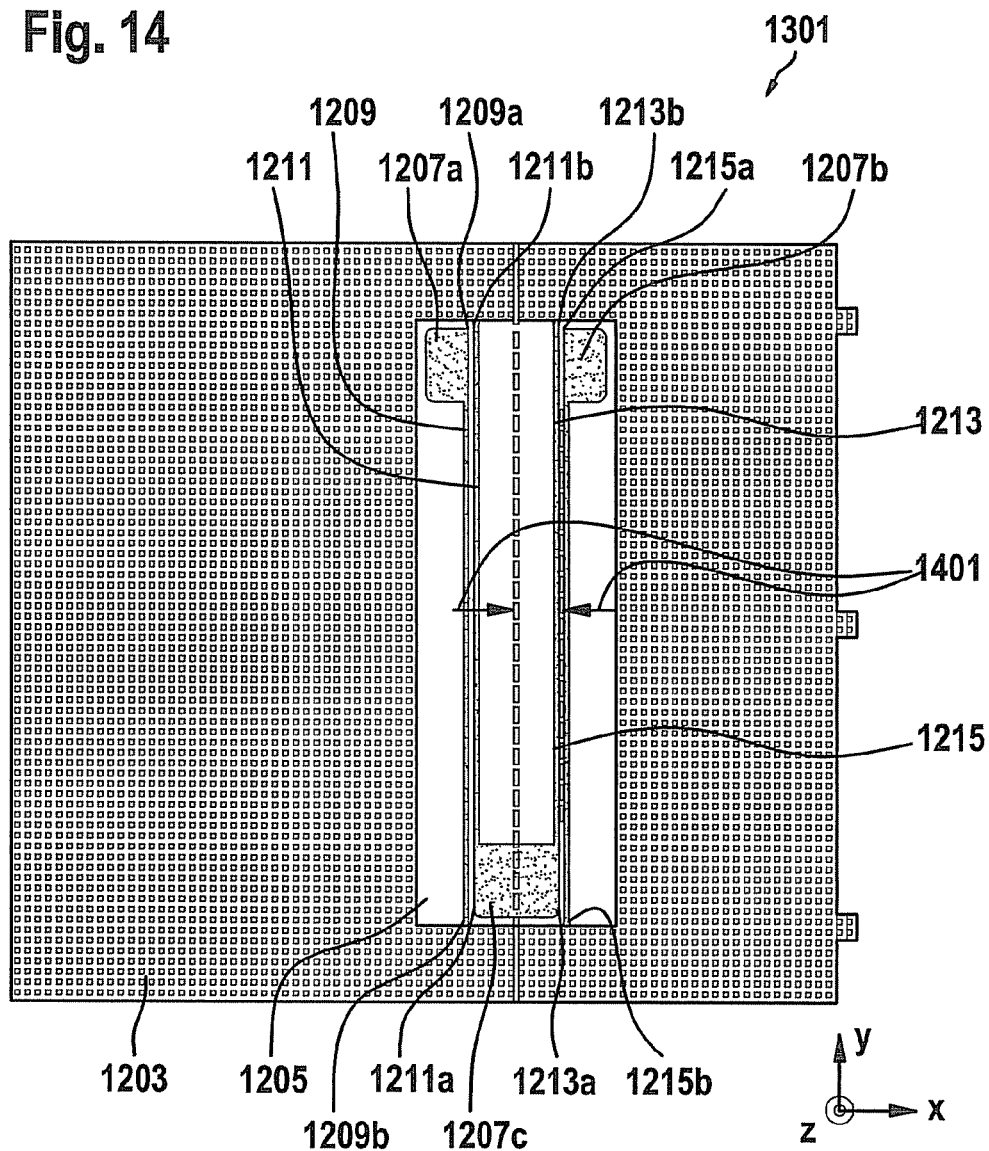
FIG. 14 is a plan view of a further inertial sensor according to the present invention.

By adapting the spacing of the two double springs from one another and/or from the rotation axis of rocker 1203, a torsional stiffness can advantageously be brought about with no changes in other geometric parameters. In the case of an increased spacing (see FIG. 14), the spacing being labeled with two arrows having the reference character 1401, the required flexure of springs 1209, 1211, 1213, and 1215 in the Z direction increases for a given torsion angle of rocker 1205, so that the resulting torsional stiffness of the spring apparatus also rises. The total torsional stiffness becomes correspondingly lower in the case of a decreased spacing of the two double springs from one another (see FIG. 15). The stiffness in the X direction is independent of a change in the spacing.

Inertial sensors of the kind shown in FIGS. 12 to 15 are advantageously particularly suitable for a sensor, in particular an acceleration sensor, that is intended to detect not only an acceleration in the Z direction but also a lateral acceleration in the X,Y plane (see FIG. 16). By varying the spacings of the double springs and the geometry of the springs themselves, in particular the spring length and/or spring width and/or spring height, it is advantageously possible to adapt, mutually independently, the stiffness values in the X,Y plane in the X direction and/or Y direction, and the torsional stiffness.

Figure 15:
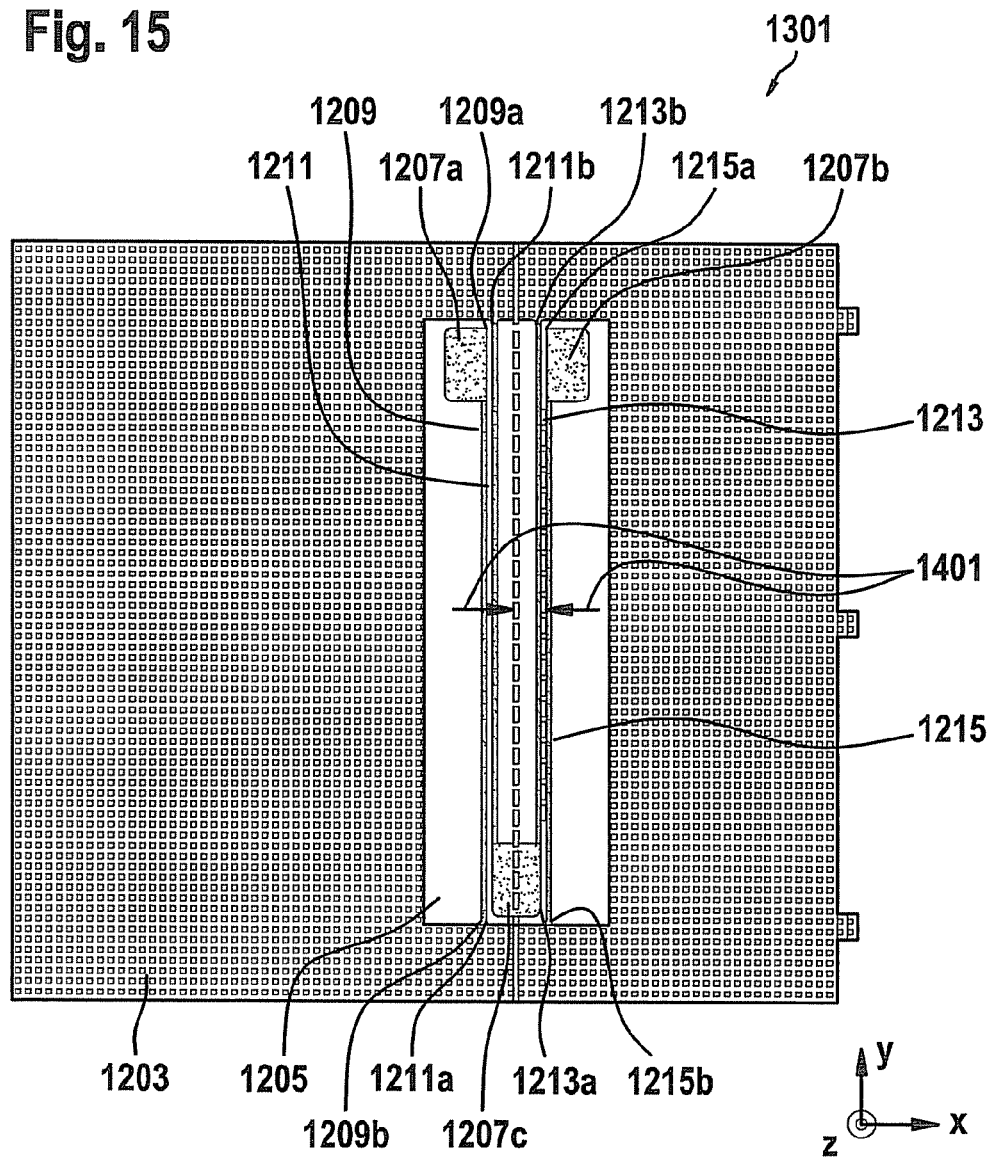
FIG. 15 is a plan view of another inertial sensor according to the present invention.

FIG. 16 shows the inertial sensor of FIG. 15, which is constituted here as an acceleration sensor 1600. The reference character 1601 identifies electrodes that detect an acceleration in the X direction in the X,Y plane. Electrodes 1601 can in that respect also be referred to, in particular, as "X-channel detection" electrodes. Electrodes 1601 are disposed in cutout 1205 parallel to one another in the Y direction, a pair of electrodes 1601 here constituting, in particular, a capacitor. X-channel detection electrodes can also, in general, be referred to as "lateral" electrodes.

The reference character 1603 identifies two strip-shaped detection electrodes for detecting an acceleration in the Z direction. Detection electrodes 1603 can in that respect also be referred to, in particular, as "Z-channel detection" electrodes. The two detection electrodes 1603 are arranged on the substrate analogously to FIG. 4, and are located opposite rocker 1203, thus constituting a differential capacitor. The capacitance of the differential capacitor will change upon a tilt of the rocker in the Z direction, so that a determination of the Z acceleration can thereby be carried out.

The inertial sensor shown in FIG. 16 is in that respect embodied as a two-channel acceleration sensor, since it can sense an acceleration in both the X direction and the Z direction. In an embodiment that is not shown, further electrodes can be constituted so that an acceleration in the Y direction can additionally also be sensed. In this case the inertial sensor is then constituted as a three-channel acceleration sensor.

In summary, the present invention supplies in particular a capability for reducing mechanical stresses in torsion springs of acceleration sensors, in particular micromechanical acceleration sensors, in a context of overload, so that spring breakages are advantageously avoided.

What is claimed is:

1. An inertial sensor, comprising:
    a substrate;
    a rocker connected to the substrate; and
    a spring apparatus, the rocker being connected to the substrate via the spring apparatus, the spring apparatus having at least two springs for suspending the rocker on the substrate, wherein the two springs are disposed with an offset from one another with reference to the at least two springs' longitudinal axes, and wherein the springs are disposed at least partly overlappingly next to one another, and in parallel next to one another.

2. The inertial sensor as recited in claim 1, wherein the spring apparatus has at least one suspension block connected to the substrate, on which at least one of the springs is mounted.

3. The inertial sensor as recited in claim 2, wherein the spring apparatus has multiple suspension blocks, and at least one of the springs being mounted on each of the suspension blocks.

4. The inertial sensor as recited in claim 1, wherein the rocker is suspended on the substrate asymmetrically with reference to a rotation axis of the rocker constituted in a rocker plane and defined by way of the longitudinal axis of the springs.

5. The inertial sensor as recited in claim 1, further comprising:
    at least one electrode, which together with the rocker, forms a capacitor for capacitive sensing of a deflection of the rocker, the at least one electrode being disposed on the substrate opposite the rocker.

6. The inertial sensor as recited in claim 5, wherein at least two electrodes are disposed on the substrate, opposite the rocker, to constitute a differential capacitor.

7. The inertial sensor as recited in claim 1, further comprising:
    a stop to limit a rocker deflection.

8. The inertial sensor as recited in claim 1, wherein the rocker has a cutout in which the spring apparatus is disposed.

9. The inertial sensor as recited in claim 1, wherein the inertial sensor is a micromechanical inertial sensor.

10. The inertial sensor as recited in claim 1, wherein the inertial sensor is an acceleration sensor.

11. The inertial sensor as recited in claim 1, wherein the inertial sensor is a multi-channel acceleration sensor.

\* \* \* \* \*